(12) United States Patent
Ushinohama et al.

(10) Patent No.: US 12,341,835 B2
(45) Date of Patent: Jun. 24, 2025

(54) SCAN APPARATUS, IMAGE PROCESSING METHOD, AND STORAGE MEDIUM

(71) Applicant: CANON KABUSHIKI KAISHA, Tokyo (JP)

(72) Inventors: Takuya Ushinohama, Ibaraki (JP); Chie Ito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/342,605

(22) Filed: Jun. 27, 2023

(65) Prior Publication Data
US 2024/0007513 A1    Jan. 4, 2024

(30) Foreign Application Priority Data
Jun. 30, 2022 (JP) ................................. 2022-105515

(51) Int. Cl.
*H04L 65/4038* (2022.01)
*H04L 12/18* (2006.01)
*H04L 65/1089* (2022.01)

(52) U.S. Cl.
CPC ...... *H04L 65/4038* (2013.01); *H04L 12/1822* (2013.01); *H04L 65/1089* (2013.01)

(58) Field of Classification Search
CPC ............. H04L 65/4038; H04L 65/1089; H04L 12/1822
See application file for complete search history.

(56) References Cited

U.S. PATENT DOCUMENTS

| | | | | |
|---|---|---|---|---|
| 7,043,529 B1* | 5/2006 | Simonoff | ................ | H04L 67/02 709/204 |
| 2003/0149731 A1* | 8/2003 | Ohwa | ................ | H04L 12/1813 709/206 |
| 2004/0008635 A1* | 1/2004 | Nelson | ................... | H04N 7/152 709/204 |
| 2006/0248077 A1* | 11/2006 | Horikiri | .................. | G06F 16/93 707/999.005 |
| 2010/0318921 A1* | 12/2010 | Trachtenberg | ......... | G06Q 10/10 345/173 |
| 2012/0249741 A1* | 10/2012 | Maciocci | .............. | G06T 19/006 348/51 |
| 2012/0308285 A1* | 12/2012 | Shoji | ..................... | G03G 15/602 399/367 |
| 2018/0365897 A1* | 12/2018 | Pahud | ..................... | G06V 20/20 |
| 2019/0065012 A1* | 2/2019 | Masi | ........................ | G09G 5/14 |

FOREIGN PATENT DOCUMENTS

JP         2022042227 A        3/2022

* cited by examiner

*Primary Examiner* — Madhu Woolcock
(74) *Attorney, Agent, or Firm* — Canon U.S.A., Inc., IP Division

(57) ABSTRACT

A scan apparatus that communicates with an information processing apparatus that provides a service for information sharing in a virtual space, the scan apparatus includes a user interface that accepts, from a user, selection of a group that is managed by the service, a scanner that generates image data by scanning an image of a document, and a communicator transmits the generated image data to the information processing apparatus, wherein an image of the image data transmitted by the communicator is displayed, to members of the selected group, in a virtual space viewable by members of the selected group.

12 Claims, 10 Drawing Sheets

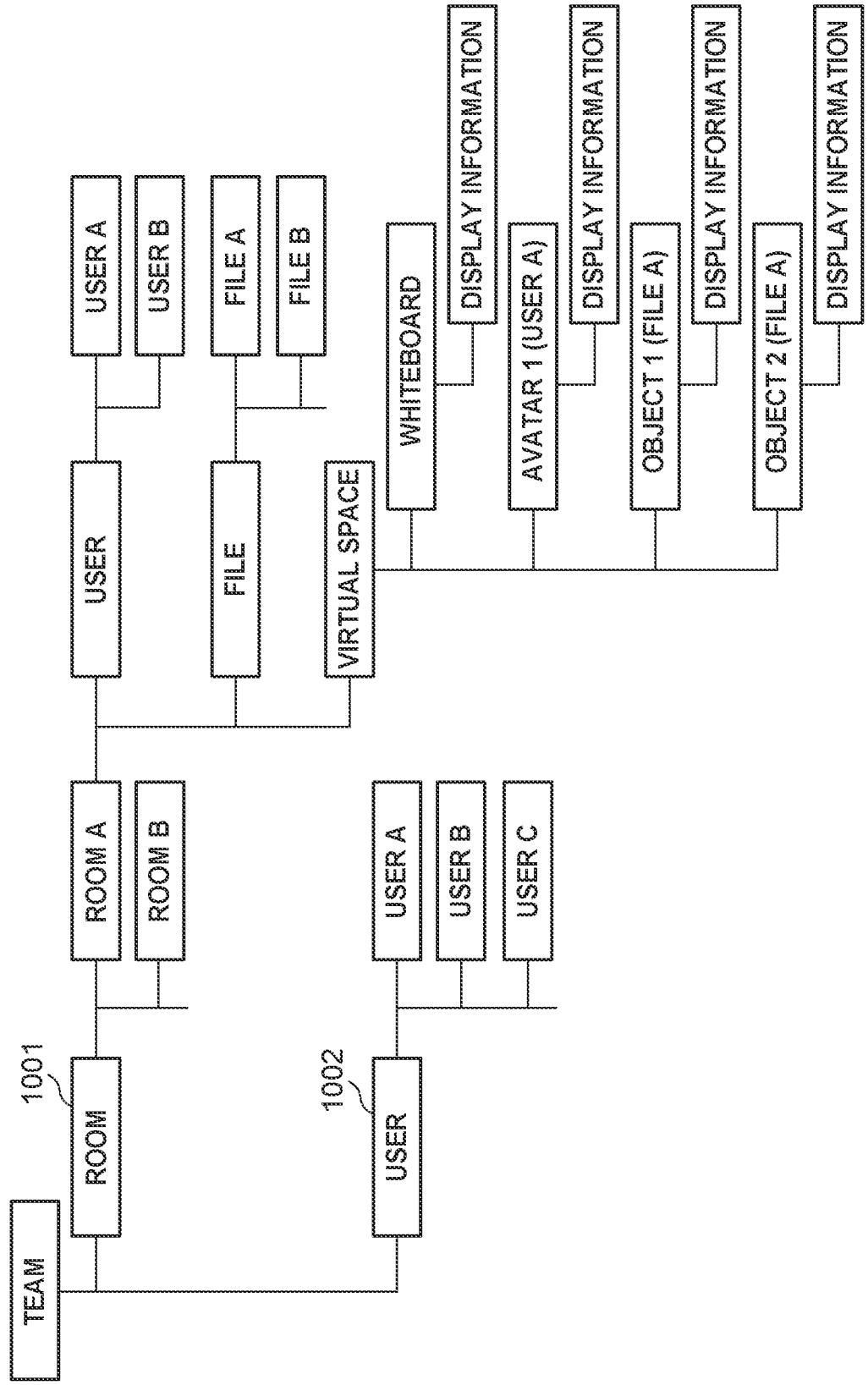

SCAN APPARATUS, IMAGE PROCESSING METHOD, AND STORAGE MEDIUM

BACKGROUND

Field

The present disclosure is related to a scan apparatus, an image processing method, and a storage medium.

Description of the Related Art

Japanese Patent Application Laid-open No. 2022-42227 discusses a technique by which a plurality of users performs voice communication and exchanges information about images and the like on an online meeting service in a virtual space that is realized by a virtual reality (VR) technology.

In a case where a user posts image data generated by scanning a document with a scan apparatus to a virtual space online meeting service, the user transmits the image data from the scan apparatus to a personal computer (PC) and posts the image data to the virtual space online meeting service from the PC, which consumes user's time and effort.

SUMMARY

The present disclosure addresses the above described issue and is directed to saving user's time and effort when image data generated by scanning is shared on a service for sharing information in a virtual space.

According to an aspect of the present disclosure, a scan apparatus that communicates with an information processing apparatus that provides a service for information sharing in a virtual space, the scan apparatus includes a user interface that accepts, from a user, selection of a group that is managed by the service, a scanner that generates image data by scanning an image of a document, and a communicator transmits the generated image data to the information processing apparatus, wherein an image of the image data transmitted by the communicator is displayed, to members of the selected group, in a virtual space viewable by members of the selected group.

Further features of the present disclosure will become apparent from the following description of exemplary embodiments with reference to the attached drawings.

BRIEF DESCRIPTION OF THE DRAWINGS

FIG. 10 is a diagram illustrating an example of a file configuration of the virtual space server.

DESCRIPTION OF THE EMBODIMENTS

Hereinbelow, an exemplary embodiment will be described in detail with reference to the drawings. The exemplary embodiment described below does not limit the present disclosure according to the scope of the claims, and not all combinations of features described in the exemplary embodiment are essential as means for solution in the present disclosure.

Figure 1:
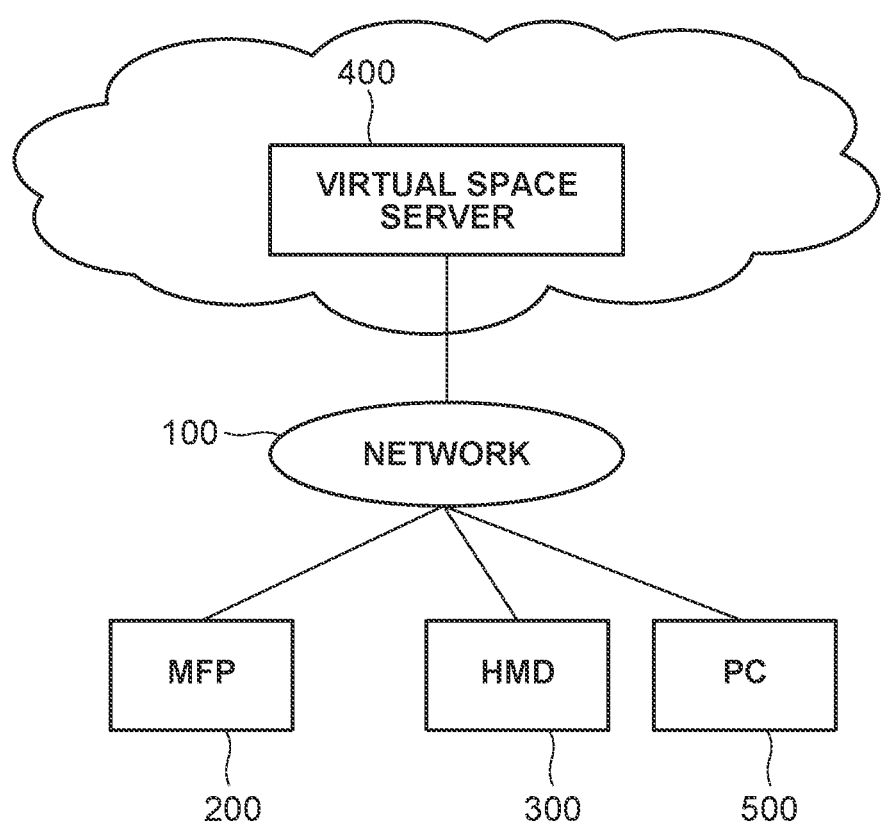
FIG. 1 is a diagram illustrating an example of a system configuration.

FIG. 1 is a diagram illustrating an example of a system configuration. The system illustrated in FIG. 1 is an image processing system in which a virtual space server 400 serving as an information processing apparatus and a multifunction peripheral (MFP) 200 serving as an image processing apparatus or a scan apparatus are connected to each other via a network 100. A head-mounted display (HMD) 300 serving as a terminal apparatus or a display apparatus, and a personal computer (PC) 500 serving as another terminal apparatus or another information processing apparatus, are also connected to the image processing system. The PC 500 can be a game machine or the like. The virtual space server 400 provides virtual spaces based on virtual reality (VR) technology and manages renderings of objects to be displayed in the virtual spaces, users participating in the virtual spaces, and contents. The HMD 300 is a user wearable head-mounted display. While the HMD 300 is employed in the present exemplary embodiment, the display apparatus is not limited to the head-mounted type but can be a goggles type, a glasses type, or a contact lens type. A user operates the PC 500 or the HMD 300 to register user information with the virtual space server 400 and perform authentication. The network 100 can be an Internet to which the MFP 200 and the virtual space server 400 are connected, or can be a local network, such as an intranet.

The HMD 300 accessing the virtual space server 400 displays a three-dimensional (3D) space including 3D objects that is a virtual space generated by the virtual space server 400, in such a manner that the user can recognize the 3D space. The 3D objects in the virtual space displayed on the HMD 300 can be images rendered by the virtual space server 400 or images rendered by the HMD 300. In a case where the HMD 300 connects to the virtual space server 400 via the PC 500, the images of the 3D objects can be rendered by the PC 500.

Figure 2:
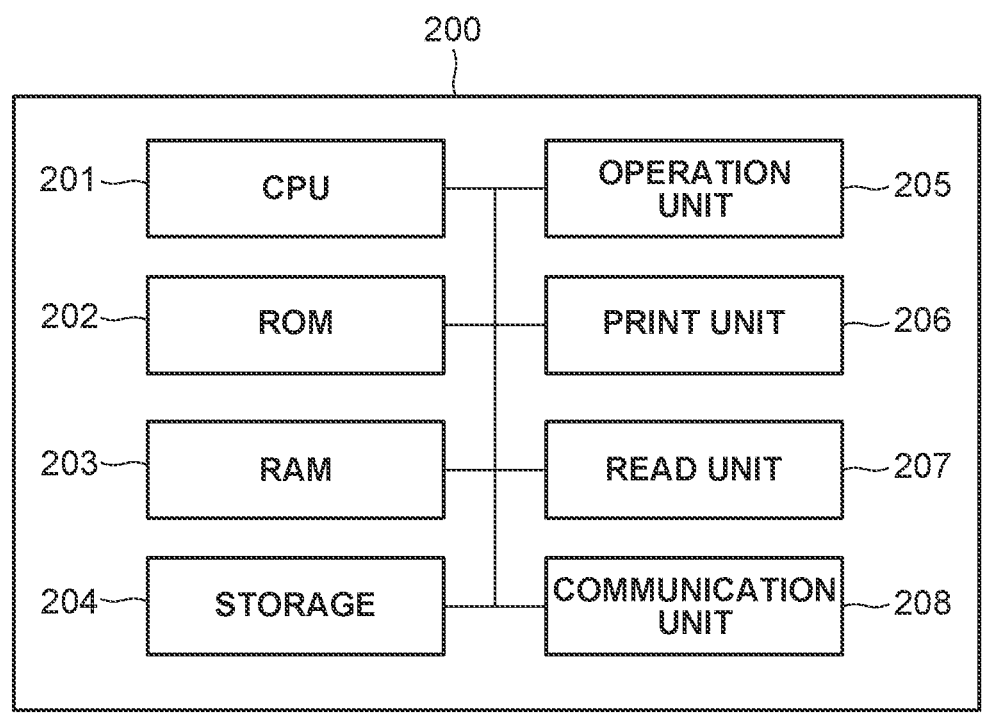
FIG. 2 is a diagram illustrating a hardware configuration of a multifunction peripheral (MFP).

FIG. 2 is a diagram illustrating a hardware configuration of the MFP 200. The MFP 200 includes a central processing unit (CPU) 201, a read-only memory (ROM) 202, a random access memory (RAM) 203, a storage 204, an operation unit 205, a print unit 206, a read unit 207, and a communication unit 208. The CPU 201 controls entire operation of the MFP 200. The CPU 201 reads a control program stored in the ROM 202 or the storage 204 to the RAM 203 and performs various types of control including read control and print control. The ROM 202 stores control programs that can be executed by the CPU 201. The RAM 203 is a main storage memory and is used as a work area and a temporary storage area where various control programs stored in the ROM 202 and the storage 204 are loaded. The storage 204 stores image data, print data, various programs and various pieces of setting information. While, in the present exemplary embodiment, a flash memory is employed as the storage 204, an auxiliary storage device such as a solid-state drive (SSD) or a hard disc drive (HDD) can also be used instead of a flash memory. Alternatively, an embedded MultiMedia- Card (eMMC) can be employed as the storage 204. The MFP 200 in the present exemplary embodiment is configured such that the CPU 201 executes processes of a procedure described below by using the RAM 203, the configuration is not limited to it. Execution of the processes in the flowchart(s) described below can be performed by a plurality of CPUs, RAMs, ROMs and storages in cooperation with each other. Some of the processes can be executed with a hardware circuit, such as an application-specific integrated circuit (ASIC) and a field-programmable gate array (FPGA).

The operation unit 205 includes a display unit, such as a touch screen, and a hardware key. The operation unit 205 displays information to the user and accepts an input from the user.

The print unit 206 prints an image based on image data (print data) stored in the RAM 203 on recording paper fed from a sheet feeding cassette (not illustrated). The read unit 207 reads an image of a document and generates image data. The image data generated based on the image read by the read unit 207 is transmitted to an external apparatus or printed on recording paper. The read unit 207 reads a document placed on a platen glass (not illustrated) with a sensor, such as a contact image sensor (CIS), and generates image data. The read unit 207 includes an auto document feeder (ADF) (not illustrated), and thus the read unit 207 can convey more than one document placed on a document tray (not illustrated), read images of the conveyed documents with the sensor, such as a CIS, and generate more than one piece of image data. In a case where the read unit 207 reads images of documents with the ADF, the user inputs a scan instruction once. In response to the MFP 200 receiving the scan instruction, a plurality of documents are conveyed and the read unit 207 scans the conveyed plurality of documents. In a case where two sheets of documents are scanned, two pieces of image data (files) can be generated. Alternatively, a file containing two pages can be generated.

The communication unit 208 is a network interface (I/F) that is connected to the network 100. The communication unit 208 transmits image data to an external apparatus and receives print data from a terminal apparatus on the network 100. Examples of the transmission and reception method via the network 100 include exchange of emails and file transmission using protocols, such as the File Transfer Protocol (FTP), the Server Message Block (SMB) protocol, Web Distributed Authoring and Versioning (WebDAV), other than email protocols. The communication unit 208 can also perform transmission and reception of image data and various pieces of setting data via the network 100 in response to accessing from the PC 500 using Hyper Text Transfer Protocol (HTTP) communication.

Figure 3:
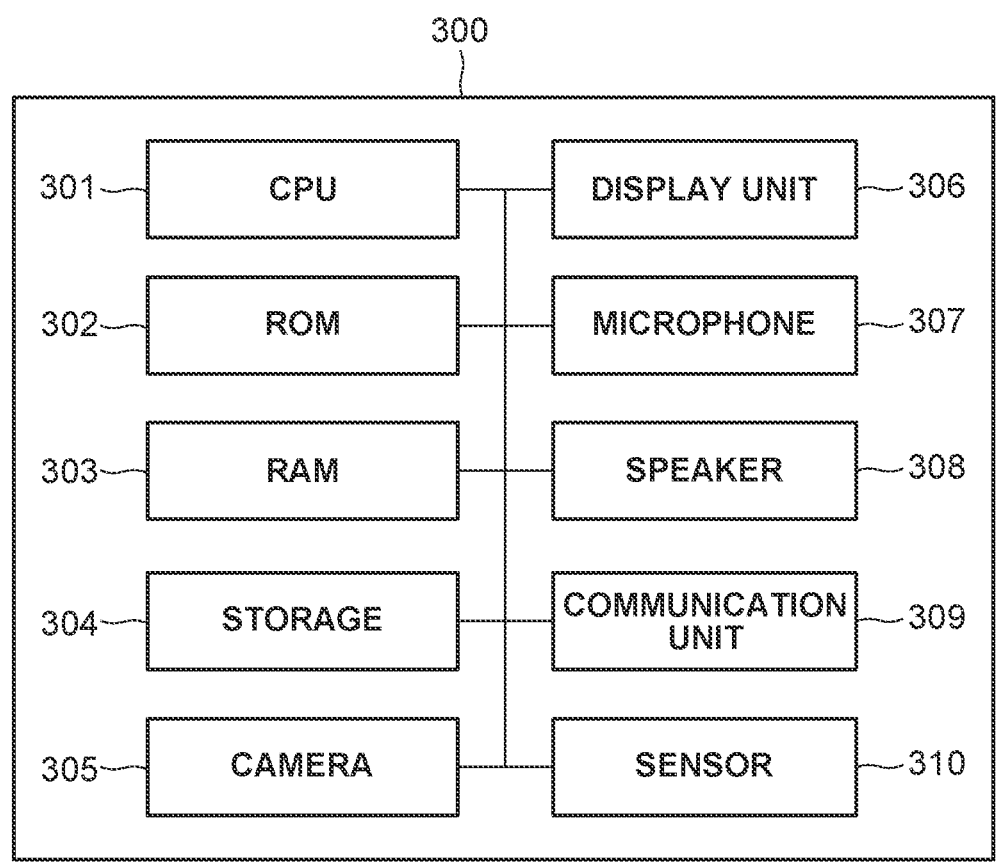
FIG. 3 is a diagram illustrating a hardware configuration of a head-mounted display (HMD).

FIG. 3 is a diagram illustrating a hardware configuration of the HMD 300. The HMD 300 includes a CPU 301, a ROM 302, a RAM 303, a storage 304, a camera 305, a display unit 306, a microphone 307, a speaker 308, a communication unit 309, and a sensor 310. The CPU 301 controls entire operation of the HMD 300. The CPU 301 reads a control program stored in the ROM 302 or the storage 304 to the RAM 303 and executes various processes to control operation of the HMD 300. The ROM 302 stores control programs that can be executed by the CPU 301. The RAM 303 is a main storage memory and is used as a work area and a temporary storage area where various control programs stored in the ROM 302 and the storage 304 are developed. The storage 304 stores application data, various programs and various pieces of setting information. While, in the present exemplary embodiment, a flash memory is employed as the storage 304, an auxiliary storage device such as an SSD or an HDD can also be employed instead of a flash memory. The camera 305 is an image capturing apparatus that acquires image data by capturing an image of the surrounding environment with an imaging sensor for converting light into an electrical signal.

The display unit 306 is a display device including a liquid crystal display panel and the like. The display unit 306 further includes a lens to correct a distortion of an image displayed on the liquid crystal display panel. Viewing the liquid crystal display panel through the lens allows the user to view a video image or an image without a distortion. The number of the liquid crystal display panels included in the display unit 306 can be one or more.

The display unit 306 displays video image data or image data processed by the CPU 301 or video image data or image data input via the camera 305.

The microphone 307 converts a voice to voice data. The speaker 308 outputs voice data or a voice signal processed by the CPU 301.

The communication unit 309 transmits and receives data to and from the virtual space server 400, the PC 500, and the MFP 200, via the network 100. The sensor 310 is a group of various sensors including a position sensor, an acceleration sensor, and the like. Based on a signal acquired with the sensor 310, a video image or an image displayed on the display unit 306 is changed. In a case of the user who wears the HMD 300 and accesses a certain virtual space, when the user turns the head leftward, a video image or an image displayed on the display unit 306 is changed. More specifically, a video image or an image of a different angle is displayed in accordance with the user's viewpoint. The configuration of the HMD 300 illustrated in FIG. 3 is an example and is not limited to the illustrated components.

Figure 4:
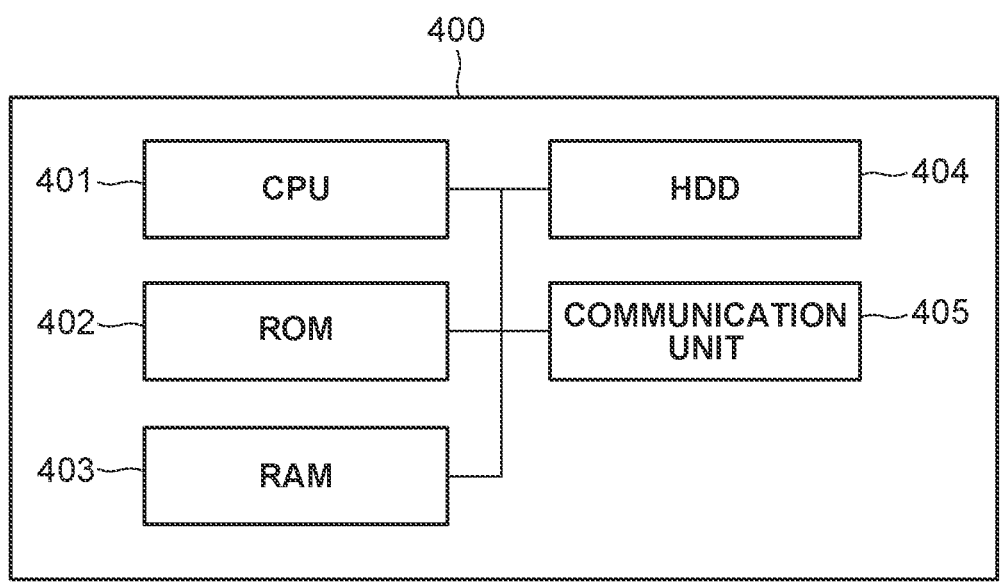
FIG. 4 is a diagram illustrating a hardware configuration of a virtual space server.

FIG. 4 is a diagram illustrating a hardware configuration of the virtual space server 400. The virtual space server 400 includes a CPU 401, a ROM 402, a RAM 403, an HDD 404, and a communication unit 405. The CPU 401 including an arithmetic circuit reads a program stored in the ROM 402 or the HDD 404 and executes various processes. The ROM 402 stores a system program and the like for control of user management and content management that is performed by the virtual space server 400. The virtual space server 400 provides a service for information sharing in a virtual space, such as an online meeting service, a chat service, a social network service (SNS). The service provides virtual spaces for respective users and groups. The HDD 404 functions as a storage area and stores an application program or the like for execution of various processes. The HDD 404 is an example of a storage apparatus, and the storage apparatus can be an SSD instead of an HDD. The communication unit 405 is an interface to connect each application with various devices. The communication unit 405 communicates with the PC 500, the HMD 300, and MFP 200 via the network 100 under control of the CPU 401. The HDD 404 stores an application installed for a service that enables a plurality of users to exchange information in a virtual space based on a virtual reality technology. A client application of the service is installed in the storage 304 of the HMD 300, the storage 204 of the MFP 200, and a storage apparatus of the PC 500.

In the present exemplary embodiment, a description will be given of a case where image data generated by scanning with the MFP 200 is uploaded (posted) to a virtual space online meeting service that is an example of services enabling a plurality of users to exchange information in a virtual space based on a virtual reality technology.

Figure 5:
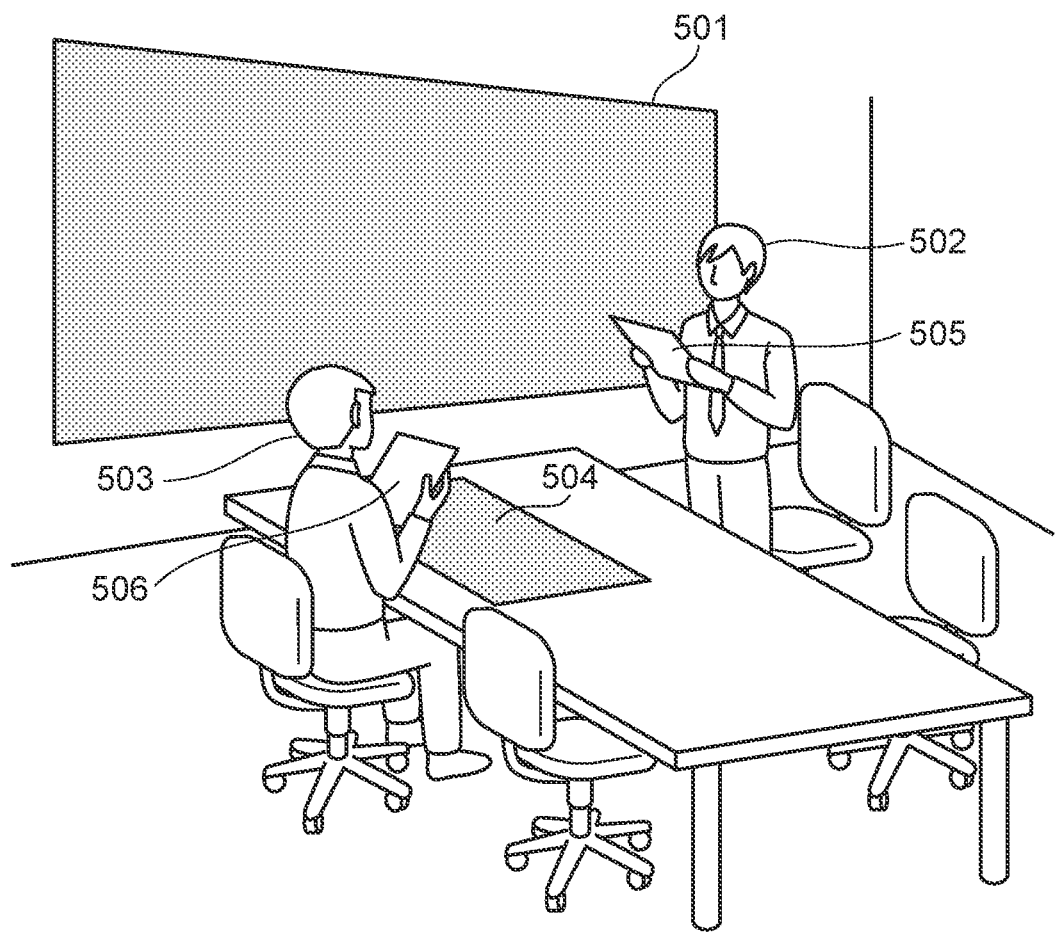
FIG. 5 is a diagram illustrating an example of a virtual space of an online meeting service.

FIG. 5 is a diagram illustrating an example of a virtual space of the online meeting service. The virtual space illustrated in FIG. 5 is a space that can be recognized by the user who wears the HMD 300 and views an image displayed on the display unit 306.

An avatar 503 is an object indicating a character of a user wearing the HMD 300 in the virtual space. An avatar 502 is an avatar of a different user participating in the same virtual space online meeting. A whiteboard 501 is an object that functions like a whiteboard in the real world on which the users can freely write text and draw pictures. On the whiteboard 501, the users can insert an image of image data. While the whiteboard 501 is employed as the object in the present exemplary embodiment, the object can be a blackboard or others as long as it functions as an object for sharing of images or texts between the users.

In front of the seat of the avatar 503, a whiteboard (hereinbelow referred to as desktop whiteboard) 504 on which part or all of the whiteboard 501 is reproduced is disposed. In a case where the avatar 503 is to write on the whiteboard 501, the avatar 503 moves to the front of the whiteboard 501 and directly writes on the whiteboard 501, or writes on the desktop whiteboard 504 and reflects the written content to the whiteboard 501. In a case where the user corresponding to the avatar 503 moves in the real world with the HMD 300 on, the avatar 503 moves in the virtual space in a synchronized manner.

Image data can be imported to the virtual space online meeting. For example, image data stored in the PC 500 can be uploaded to the virtual space server 400 in such a manner that the user transmits the image data to the virtual space server 400 via a portal site provided by the virtual space server 400 by using the PC 500. The uploaded image data is displayed in response to the user inputting an operation via the HMD 300 or a display instruction via a controller (not illustrated) connected to the HMD 300 in the virtual space illustrated in FIG. 5. Instead of inputting an operation or an instruction in the virtual space, inputting of the display instruction can also be performed on the portal site provided by the virtual space server 400.

Displayed objects 505 and 506 held in hands of the avatars 502 and 503, respectively, are examples of objects that display image data imported to the virtual space. The users can move positions of the objects 505 and 506 by operating the controller (not illustrated) and change the sizes of the objects 505 and 506. More specifically, the users can enlarge or reduce the displayed image data.

The objects 505 and 506 are writable objects similar to the whiteboard 501. The image data is data uploaded to the virtual space.

Figure 6:
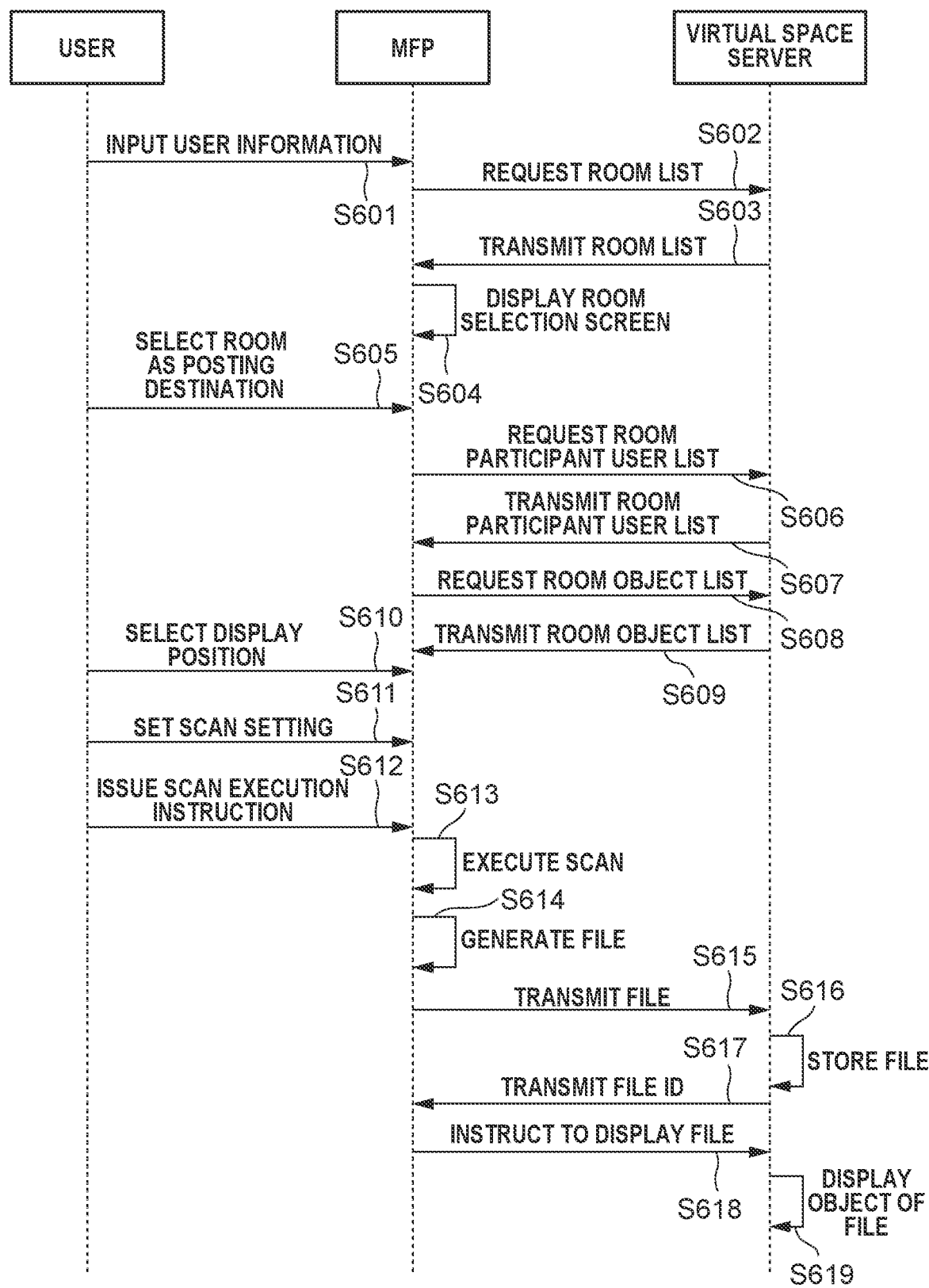
FIG. 6 is a sequence diagram illustrating an example of scan to virtual space processing.

FIG. 6 is a sequence diagram illustrating an example of scan to virtual space processing. A procedure of the sequence diagram is started in response to a scan to virtual space button 802 displayed on a home screen 801 being pressed.

In step S601, the user inputs a user identification (ID) and a password registered with the online meeting service to the operation unit 205 of the MFP 200 to obtain permission to issue an information acquisition request and a processing request to the virtual space server 400. In the information acquisition request and the processing request to the virtual space server 400 in the steps described below, token information serving as authentication information that is obtained by transmitting the input user ID and the input password to the virtual space server 400 in step S601 is used. Alternatively, the user ID and the password input by the user in step S601 can be used as is for authentication.

In step S602, the CPU 201 of the MFP 200 controls the communication unit 208 to request that the virtual space server 400 transmits room list information via HTTP communication. Specifically, the CPU 201 transmits, to the virtual space server 400, the token information obtained in step S601 and information indicating a request for a list of rooms in which the user indicated in the token information participates. The request can be transmitted to the virtual space server 400 in response to a room selection button 807 on a setting screen 803 being selected or the scan to virtual space button 802 being selected.

Here, a room refers to a group that is managed by the online meeting service and serves as a unit or the like to which a plurality of users belongs as illustrated in FIG. 10. Each room corresponds to a virtual space as illustrated in FIG. 5. Each team can be associated with a plurality of rooms, and the plurality of rooms can be differently used in accordance with topics and purposes even in the same team. Each room is associated with a plurality of users participating in the room, and users other than the associated users can be prevented from participating in the room.

A plurality of users participating in a certain room and a virtual space corresponding to the certain room are associated with each other. Information indicating a virtual space, such as an ID or a name of the virtual space, can be used to identify the room, and the virtual space and the plurality of users can be directly associated with each other. A room can be associated with a plurality of virtual spaces. In this case, after accepting selection of a posting destination room via the operation unit 205 of the MFP 200, the MFP 200 can display a list of identification information corresponding to the room, such as IDs and names of the plurality of virtual spaces, to accept user's selection. Then, the MFP 200 transmits an instruction to display an image of image data in the virtual space to the virtual space server 400, and the image of the image data transmitted from the MFP 200 is displayed in the selected virtual space. The identification information of the virtual spaces displayed on the operation unit 205 is information received by the MFP 200 from the virtual space server 400, similar to the identification information of the room.

A plurality of objects is associated with the virtual space. Examples of the plurality of objects associated with the virtual space include a whiteboard, an avatar, a table, a chair, and the like.

In step S603, the CPU 401 of the virtual space server 400 checks whether access of the user is permitted, based on the token information transmitted from the communication unit 208 of the MFP 200. In a case where the access is permitted, the CPU 401 generates room list information about a list of rooms in which the user corresponding to the token information participates. The room list information is sequence information indicating information about rooms in which a user participates. The room information contains a room ID and a room name. The generated room list information is transmitted to MFP 200 via the communication unit 405 of the virtual space server 400 as response information of HTTP communication. While, the token information indicates the user in the above description, the token information can indicate a team. In this case, in response to the token information transmitted to the virtual space server 400, the virtual space server 400 transmits a list of rooms associated with the team indicated in the token information to the MFP 200.

In step S604, the CPU 201 of the MFP 200 generates a room selection screen 811, based on room information contained in the received room list information. In response to the user selecting the room selection button 807, the CPU 201 of the MFP 200 displays the room selection screen 811 on the operation unit 205 and waits for a user operation. The room selection screen 811 will be described in a description of FIG. 8.

Figure 8:
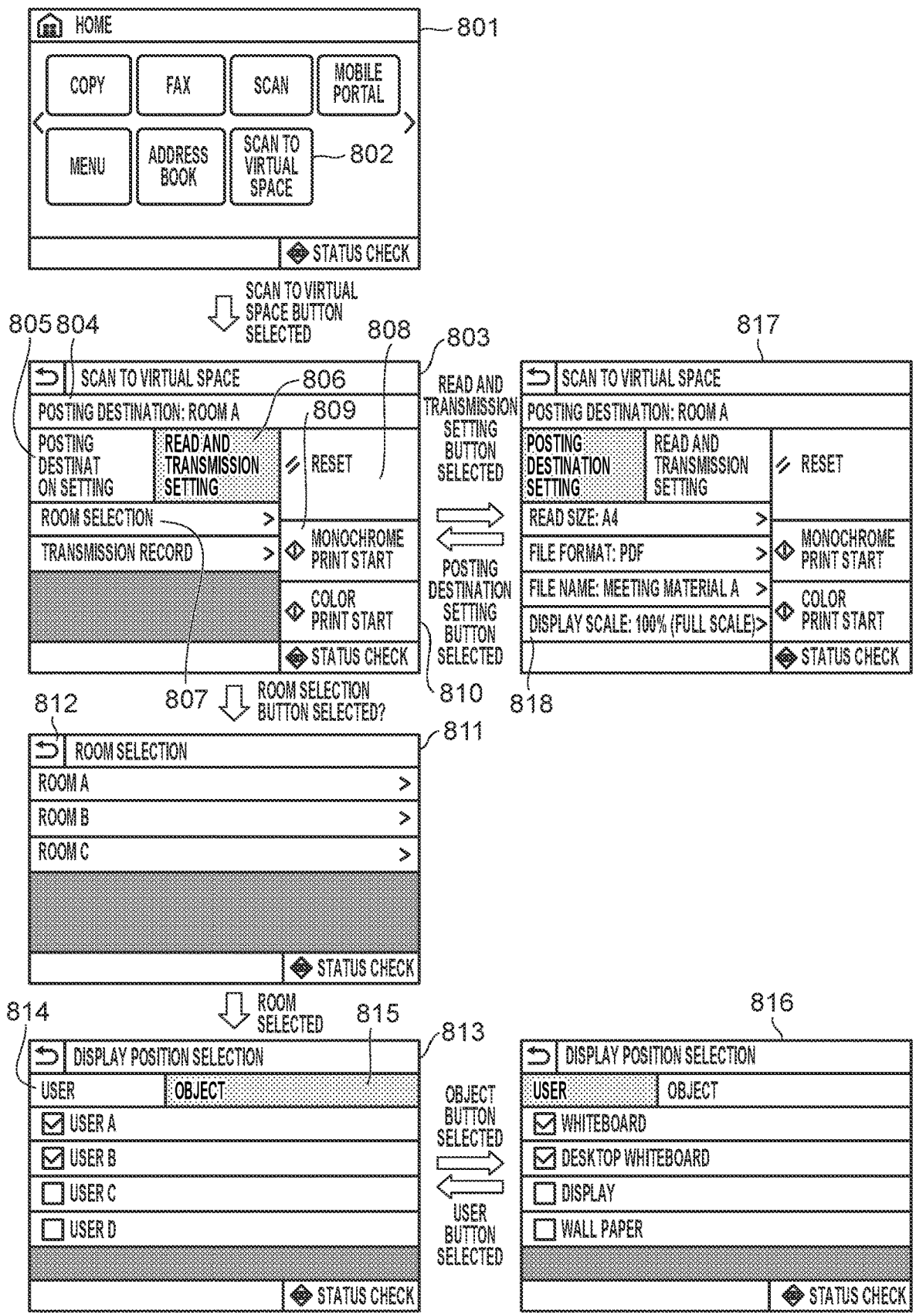
FIG. 8 is a diagram illustrating an example of screen transition.

FIG. 8 is a diagram illustrating an example of screen transition. In response to the scan to virtual space button 802 displayed on the home screen 801 being selected, the setting screen 803 is displayed on the operation unit 205.

The setting screen 803 displays a reset button 808. In a case where the reset button 808 is selected, information set on the setting screen 803 is cleared. In this processing, set destination information is cleared. In a case where a monochrome print start button 809 or a color print start button 810 is selected on the setting screen 803, scanning of a document placed on the platen glass or the document tray of the ADF is started. Generated image data or a file generated based on the image data is transmitted to the virtual space server 400.

In response to a posting destination setting button 805 being selected, the room selection button 807 is displayed. In response to a read and transmission setting button 806 being selected, a setting screen 817 on which read and transmission setting items are displayed is displayed.

The setting screen 817 accepts a read size setting, a file format setting, a file name setting, and a display scale setting, and the like. In response to a display scale change button 818 being selected, a display size of an image which is an image of image data generated by scanning and is displayed in the virtual space can be set. For example, in a case where 100 percent (%) (full scale) is set, an image having the same size as the size of the scanned document is displayed in the virtual space. Specifically, when the user views the image displayed on the HMD 300, the image having the same size as the size of the real document is displayed, which means that the size of the document image with respect to a distance from the user's viewpoint to the document in the real world and the size of the image with respect to a distance from the user's viewpoint via the HMD 300 are equivalent to each other. An automatic scale setting can also be set to automatically change a display scale in accordance with a display target object.

In response to the room selection button 807 being selected, the room selection screen 811 is displayed. Rooms displayed in the room selection screen 811 are displayed based on the room list information received by the MFP 200 from the virtual space server 400. On the room selection screen 811, the user can select a posting destination room.

In response to a room being selected on the room selection screen 811, a display position selection screen 813 on which a display position of the file is selected is displayed. On the display position selection screen 813, a list of users currently participating in the virtual space online meeting is displayed. A plurality of users can be selected on the display position selection screen 813, and a check mark is displayed on a checkbox of the selected user. In an example illustrated in FIG. 8, USER A and USER B are selected as display positions. The display position selection screen 813 can also be displayed by selection of a user button 814.

In addition to a user, an object existing in the virtual space can also be specified as a display position of image data. In response to an object button 815 being selected, a display position selection screen 816 on which an object is selected from a list is displayed. On the display position selection screen 816, a plurality of objects can be selected, and a check mark is displayed on a checkbox of the selected object. In the example of FIG. 8, WHITEBOARD and DESKTOP WHITEBOARD are selected. While, the display position selection screen 816 is configured such that selection is performed from among objects existing in the virtual space, the user can input coordinate information indicating a position (coordinates) where the user desires to display an image.

In a case where user selection or coordinate information specification is performed, a new object is generated, and an image of image data to be transmitted on the object is displayed.

In response to a return button 812 being selected, contents of the room selection and the display position selection are stored, and the setting screen 803 is displayed again. In this processing, ROOM A which is the selected room as the posting destination is displayed in a posting destination field 804.

In response to the room selection on the room selection screen 811 in step S605, the CPU 201 of the MFP 200 sets the selected room as a room (virtual space) to which the image data generated by scanning is to be posted.

In step S606, the CPU 201 of the MFP 200 controls the communication unit 208 to request that the virtual space server 400 transmits information on a list of users participating in the room set in step S605.

In step S607, the CPU 401 of the virtual space server 400 generates user list information about users participating in the room requested in step S606. The user list information is sequence information indicating information about users participating in a room. The information about users includes user IDs, user names, and information about whether the users currently participate in the virtual space online meeting. The generated user list information is transmitted to MFP 200 via the communication unit 405 of the virtual space server 400 as response information of HTTP communication.

In step S608, the CPU 201 of the MFP 200 controls the communication unit 208 to request that the virtual space server 400 transmits object list information about objects existing in the virtual space of the room set in step S605. Examples of the objects include the whiteboard 501, the desktop whiteboard 504, a desk, a chair, and the like.

In step S609, the CPU 401 of the virtual space server 400 generates the object list information of the objects existing in the virtual space of the room requested in step S608. The object list information is sequence information indicating information about the objects existing in the virtual space. The information about the objects includes object names, object IDs, 3D coordinates of the objects in the virtual space. The generated object list information is transmitted to MFP 200 via the communication unit 405 of the virtual space server 400 as a response information of HTTP communication.

In response to a display position being selected on the display position selection screens 813 and 816 in step S610, the CPU 201 of MFP 200 determines a position where an image of image data is to be displayed in the virtual space.

In step S611, the CPU 201 of the MFP 200 accepts a scan setting and a transmission setting on the setting screen 817.

In step S612, the CPU 201 of the MFP 200 accepts a scan execution instruction via the operation unit 205.

In step S613, the CPU 201 of the MFP 200 controls the read unit 207 to scan an image of a document in accordance with the scan setting set in step S611 and generates image data.

In step S614, the CPU 201 of the MFP 200 generates a file having a format set in the scan setting from the image data generated by scanning.

In step S615, the CPU 201 of the MFP 200 transmits information indicating the posting destination room set in step S605, the file (image data) generated in step S614, and the token information to the virtual space server 400 from the communication unit 208 via HTTP communication.

In step S616, the CPU 401 of the virtual space server 400 executes authentication using the token information received in step S615, and in a case where the authentication has been successful, the CPU 401 stores the received file and the room specified in the room information in an associated manner. The stored file can be browsed by the user participating in the room with the PC 500 or the HMD 300. The stored file can be displayed in the virtual space as an object.

In step S617, the CPU 401 of the virtual space server 400 transmits a transmission result and a file ID uniquely indicating the file stored in association with the room in step S616, to MFP 200 as response information of HTTP communication. In a case where the transmission has been successful, the CPU 201 of the MFP 200 can display, on the operation unit 205, a notification notifying that the transmission has been successful. In a case where the transmission has been failed, the CPU 201 of the MFP 200 can display, on the operation unit 205, a notification notifying that the transmission has been failed. Alternatively, no notification can be displayed in a case where the transmission has been successful, and a notification can be displayed in a case where the transmission has been failed.

In step S618, the CPU 201 of the MFP 200 instructs, via the communication unit 208, the virtual space server 400 to display the file transmitted in step S615 in the virtual space. In the display instruction, the file ID uniquely indicating the file transmitted from the virtual space server 400, the information about the room set in step S605, and the display position information indicating the display position in the virtual space set in step S610 are transmitted to the virtual space server 400 via HTTP communication. The display position information is information about a display position that is used when a file or an image of image data is displayed in a virtual space. The display position information contains information indicating a user or an object existing in the virtual space. While the display position information is specified with an ID uniquely indicating a user or an object, the display position information can be specified in further details, for example, the user's hand, the user's gaze point, and a center of an object. The display position can also be specifically specified with 3D coordinates. In the display instruction, material information indicating a display size and a texture of a file and a display method of a case where the file has a plurality of pages can also be specified. Examples of the display method of the case where the file has a plurality of pages include a method of displaying the file as an object of a printed material like the one in the real world and a method of displaying the file using an object on which a certain page can be displayed and the display page can be changed in response to a user performing a page change operation.

In step S619, the CPU 401 of the virtual space server 400 generates an object for displaying the file indicated by the file ID received in S618 and displays the object at a position specified in the display position information. In a case where an already existing object is specified as a display position, an image of the file is displayed over the object. In a case where a plurality of display positions is specified in the display position information, the number of the objects specified in the display position information are generated.

In a case where the display position is specified in the display position information with an ID indicating a user or an object, the image of the file is displayed at a display position predetermined for each of the user and the object. For example, in a case of an ID indicating a user, the display position is predetermined such that the image of the image file is displayed at the avatar's gaze point.

While, in the present exemplary embodiment, the description has been given using the MFP 200 as the scan apparatus, the configuration is not limited to it. For example, a 3D scanner that scans an object and generates 3D data can also be used as the scan apparatus. In this case, 3D data generated by the 3D scanner is posted (uploaded) to a room or at a position accepted via an operation unit of the 3D scanner and displayed.

Figure 7:
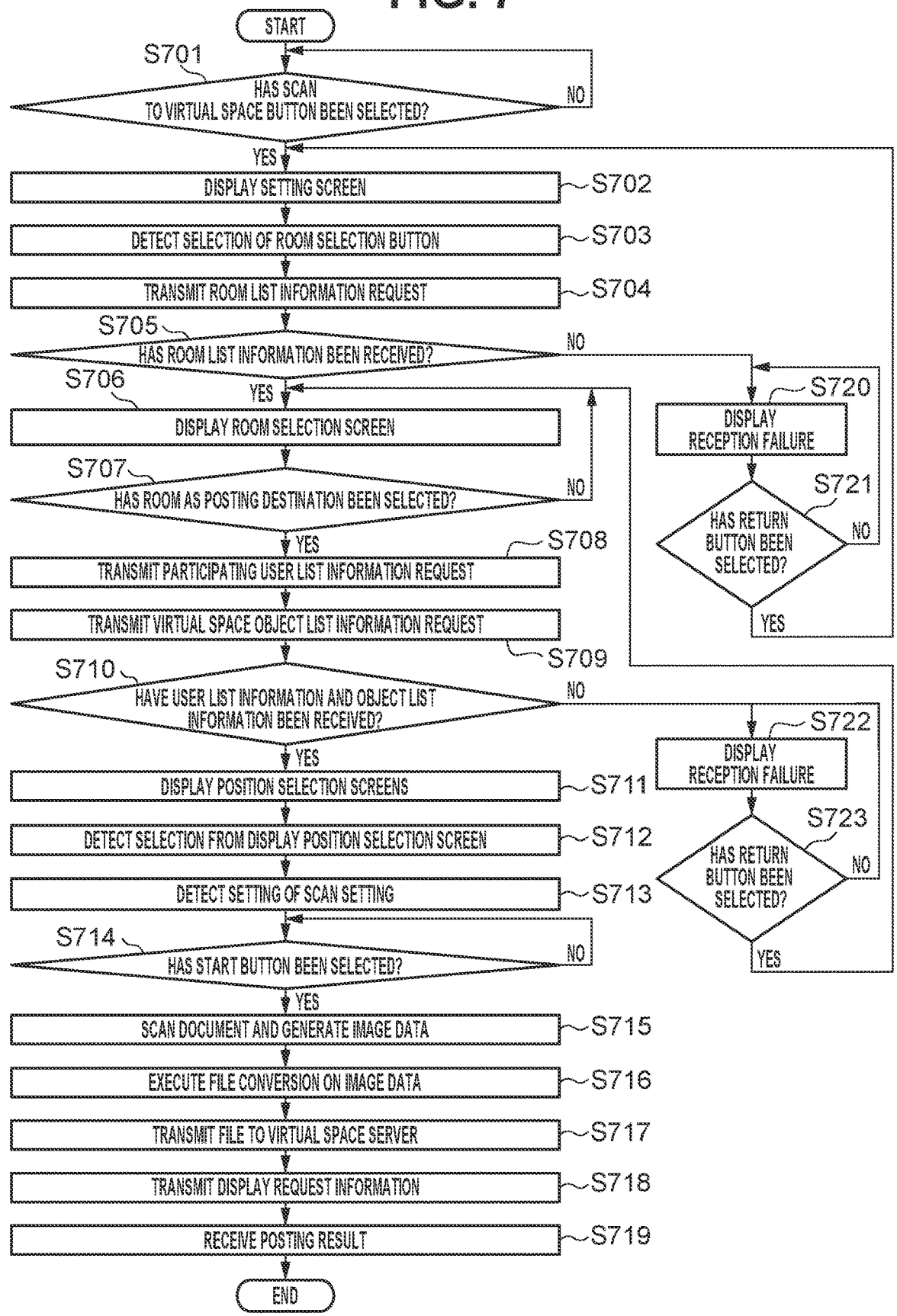
FIG. 7 is a flowchart illustrating an example of the scan to virtual space processing.

FIG. 7 is a flowchart illustrating an example of the scan to virtual space processing. A procedure of the flowchart illustrated in FIG. 7 is executed by the CPU 201 reading a program stored in the ROM 202 to the RAM 203 and executing the program. The procedure of the flowchart illustrated in FIG. 7 is started when the power of the MFP 200 is turned on.

In step S701, the CPU 201 determines whether the scan to virtual space button 802 has been selected. In a case where the CPU 201 determines that the scan to virtual space button 802 has been selected (YES in step S701), the processing proceeds to step S702. In a case where the CPU 201 determines that the scan to virtual space button 802 has not been selected (NO in step S701), the processing returns to step S701.

In step S702, the CPU 201 displays the setting screen 803 on the operation unit 205.

In step S703, the CPU 201 detects that the room selection button 807 has been selected.

In step S704, the CPU 201 executes processing for transmission of information indicating a room list information request to the virtual space server 400 via HTTP communication, by using the token information obtained in advance.

In step S705, the CPU 201 determines whether room list information has been received from the virtual space server 400 in response to the room list information request transmitted in step S704. Specifically, in a case where a status code in a response of HTTP communication indicates error or in a case where body information of the response contains a parameter indicating an information acquisition failure, the CPU 201 determines that room list information has not been received. In a case where the CPU 201 determines that room list information has been received (YES in step S705), the processing proceeds to step S706. In a case where the CPU 201 determines that room list information has not been received (NO in step S705), the processing proceeds to step S720.

In step S720, the CPU 201 displays, on the room selection screen 811, information indicating a failure of reception of room list information. In this processing, room selection options are not displayed on the room selection screen 811.

In step S721, the CPU 201 determines whether the return button 812 has been selected.

In a case where the CPU 201 determines that the return button 812 has been selected (YES in step S721), the processing returns to step S702. In a case where the CPU 201 determines that the return button 812 has not been selected (NO in step S721), the processing returns to step S720.

In step S706, the CPU 201 displays the room selection screen 811 on the operation unit 205, based on the room list information received from the virtual space server 400.

In step S707, the CPU 201 detects via operation unit 205 whether a room as a posting destination has been selected in the room selection screen 811. In a case where the CPU 201 determines that a room as a posting destination has been selected in the room selection screen 811 (YES in step S707), the processing proceeds to step S708. In a case where the CPU 201 determines that a room as a posting destination has not been selected in the room selection screen 811 (NO in step S707), the processing returns to step S706. A method of detecting the selection is based on determination of whether any room displayed on the room selection screen 811 has been selected. In a case of a screen configuration in which a confirmation button is displayed on the screen of the operation unit 205, the above described transition is also performed in response to selection of the confirmation button.

In step S708, the CPU 201 executes processing for transmission of information indicating a request for a user list information indicating users currently in the room selected in step S707 to the virtual space server 400 via HTTP communication by using the token information acquired in advance. The user currently in the room (user currently participating in the online meeting) is a user who has participated in the virtual space of the selected room as an avatar at a timing of when the posting destination room is determined in step S707. In addition, the user currently in the room is a user who can browse other users' avatars, a whiteboard, and other objects that are displayed in the virtual space.

In step S709, the CPU 201 executes processing for transmission of information about a request for object list information indicating objects existing in the virtual space of the room selected in step S707, via HTTP communication by using the token information acquired in advance.

In step S710, the CPU 201 determines whether user list information and object list information have been received from the virtual space server 400 in response to the user list information request transmitted in step S708 and the object list information request transmitted in step S709. Specifically, in a case where a status code in a response of HTTP communication indicates error or in a case where body information of the response contains a parameter indicating an information acquisition failure, the CPU 201 determines that at least either one of user list information and object list information has not been received. In a case where the CPU 201 determines that user list information and object list information have been received (YES in step S710), the processing proceeds to step S711. In a case where the CPU 201 determines that at least one of user list information and object list information has not been received (NO in step S710), the processing proceeds to step S722.

In step S722, the CPU 201 displays, on the room selection screen 811, information indicating a failure of reception of either or both of user list information and object list information. In this processing, room selection options are not displayed on the room selection screen 811.

In step S723, the CPU 201 determines whether the return button 812 has been selected.

In a case where the CPU 201 determines that the return button 812 has been selected (YES in step S723), the processing returns to step S706. In a case where the CPU 201 determines that the return button 812 has not been selected (NO in step S723), the processing returns to step S722.

In step S711, the CPU 201 displays, on the operation unit 205, the display position selection screens 813 and 816 on which a user list and an object list received from the virtual space server 400 are displayed.

In step S712, the CPU 201 detects, via the operation unit 205, selection performed on the user list and the object list displayed on the display position selection screens 813 and 816, respectively. The user can select a plurality of display positions. In response to the display position selection, the processing proceeds to step S713. Completion of the selection is detected based on determination of whether a return button displayed on the display position selection screen 813 or a return button displayed on the display position selection screen 816 has been selected. In a case of a screen configuration in which a confirmation button is displayed on the screen of the operation unit 205, the above described transition is also performed in response to selection of the confirmation button.

In step S713, the CPU 201 detects via the operation unit 205 that setting is performed on the scan setting displayed on the setting screen 817. The scan setting includes a read size of a document in scanning, a storage file format, a file name, and the like. A display scale and the like of an image file in the virtual space can also be displayed as an option of the transmission setting.

In step S714, the CPU 201 determines whether the monochrome print start button 809 or the color print start button 810 displayed on the operation unit 205 has been selected. In a case where the CPU 201 determines that the monochrome print start button 809 or the color print start button 810 has been selected (YES in step S714), the processing proceeds to step S715. In a case where the CPU 201 determines that the monochrome print start button 809 or the color print start button 810 has not been selected (NO in step S714), the processing returns to step S714.

In step S715, the CPU 201 controls the read unit 207 based on the scan setting to read a document and generates image data.

In step S716, the CPU 201 converts the image data generated in step S715 into a file having a format set on the screen of the transmission setting.

In step S717, the CPU 201 transmits the file generated in step S716 and a posting parameter to the virtual space server 400 by a POST method of HTTP communication, by using the token information acquired in advance. The posting parameter contains an uploading destination room, a file name, a display scale, and the like. These pieces of data, i.e., the file converted from the image data and the posting parameter, are transmitted to the virtual space server 400, and thus the virtual space server 400 performs control such that the received file is posted to the selected room.

In step S718, the CPU 201 transmits, to the virtual space server 400, display request information indicating a request for displaying of the file posted in step S717 via the HTTP communication in the virtual space, by using the token acquired in advance. The display request information contains information on the display position selected in step S712 and the file ID.

In step S719, the CPU 201 receives a posting result from the virtual space server 400 and displays the result on the operation unit 205.

As the above described procedure, the MFP 200 in the present exemplary embodiment executes processing for generation of image data by reading an image of a document in response to a scan execution instruction received from a user and processing for transmission of the image data to the virtual space server 400. More specifically, the scan processing and the transmission processing can be executed in response to a single instruction, which reduces processing for separately receiving a scan instruction and a transmission instruction.

Figure 9:
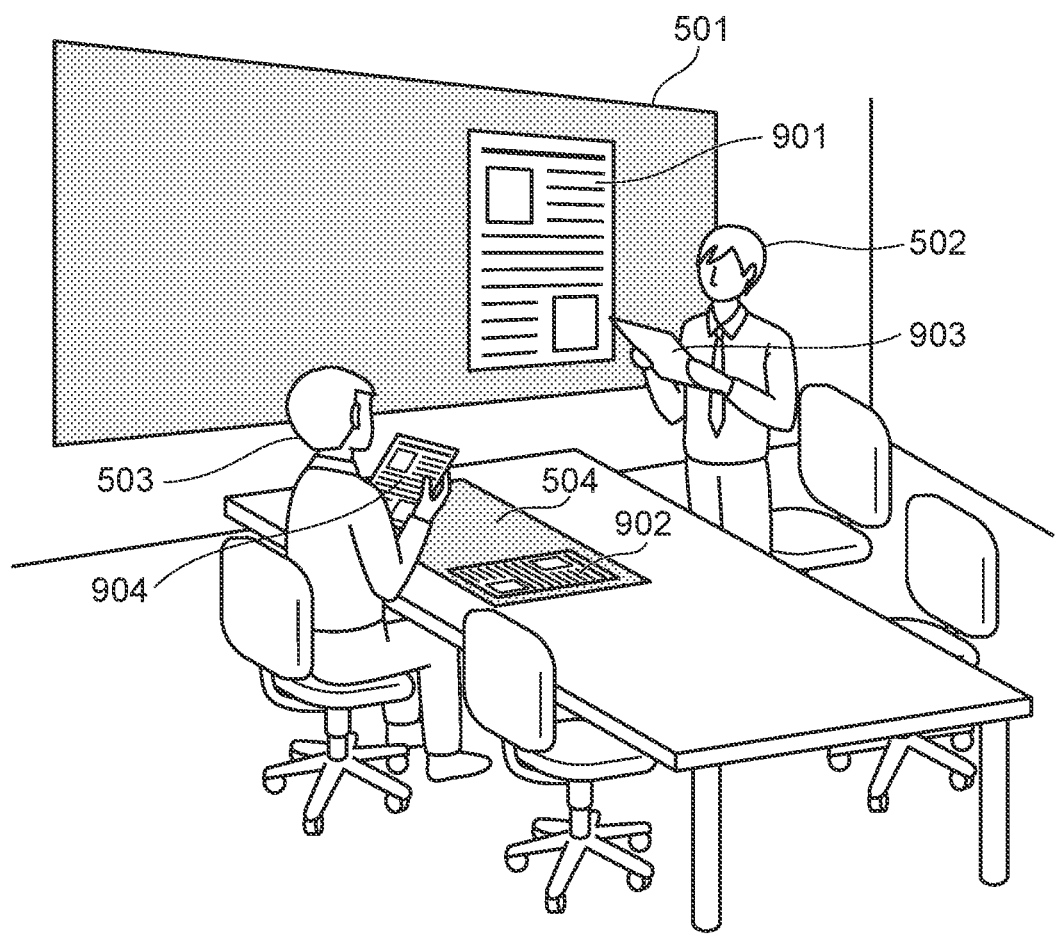
FIG. 9 is a diagram illustrating an example of the virtual space to which image data generated by scanning is posted.

FIG. 9 is a diagram illustrating an example of a virtual space to which image data generated by scanning is uploaded. Objects 901, 902, 903, and 904 are objects displayed (posted) in response to transmission of image data generated by scanning, uploading of parameters, and a display instruction to the virtual space server 400 with the MFP 200. FIG. 9 illustrates a case in which the whiteboard 501, the desktop whiteboard 504, the user of the avatar 502, and the user of the avatar 503 are selected as display positions. The users currently (participating) in the room of the virtual space online meeting can view the image of the image data by browsing the objects 901, 902, 903, and 904.

In a case where the whiteboard 501 is selected as a display position, the image is displayed on a part of the region of the whiteboard 501. The users participating in the virtual space online meeting can add texts, lines, and drawings on the whiteboard 501 on which the image is displayed, so that the information can be shared between the users. The similar operation can be performed on the desktop whiteboard 504.

The objects 903 and 904 are objects that have not existed before posting of the image data generated by scanning. More specifically, the objects 903 and 904 are objects newly generated by the virtual space server 400 in response to transmission of the image data generated by scanning to the virtual space server 400.

FIG. 10 is a diagram illustrating an example of a file configuration of the virtual space server 400. The file structure illustrated in FIG. 10 is stored in the HDD 404 of the virtual space server 400. The virtual space server 400 manages data containing data sets named "room", "user" and the like in the largest group named "team". A room 1001 is a group created in the team to have a debate on a certain consistent topic, and members participating in the room 1001 can make discussions in a chat room or a virtual space associated with the room 1001. Each room is created by a user of the team, and a user A and a user B participate in a room A, for example. A member can be added to a room by sending an invitation. A user 1002 is a user participating in the team.

Each room is provided with a virtual space like the room illustrated in FIG. 5, and the virtual space is available for members participating in the corresponding room. In each virtual space, various objects including a whiteboard, an avatar, an object for displaying an image file, which are associated with the virtual space, are displayed, and each of the objects contains display information, such as 3D coordinates and the size, that is used for displaying. A file posted to a room is stored in association with the room, and the file can be imported to the virtual space and displayed as an object by a user operation.

In a virtual space, a plurality of objects based on the same file may be displayed, which allows users at positions some distance away from each other in the virtual space to check the same file at the same time.

Files of image data and text data are also associated with each room.

The files associated with a room can be displayed in a virtual space by a display instruction issued from a user via the HMD 300 in the virtual space.

Execution of the above described processing leads to saving of user's time and effort in a case where an image data generated by scanning is posted to a service for information sharing in a virtual space.

The present exemplary embodiment includes the following configurations.

(Configuration 1)

A scan apparatus capable of communicating with an information processing apparatus that provides a service for information sharing in a virtual space, the scan apparatus includes an acceptance unit configured to accept, from a user, selection of a group that is managed by the service, a read unit configured to generate image data by scanning an image of a document, and a transmission unit configured to transmit the generated image data to the information processing apparatus, wherein an image of the image data transmitted by the transmission unit is displayed in a virtual space corresponding to the selected group.

(Configuration 2)

The scan apparatus according to Configuration 1, further includes a receiving unit configured to receive information about a group that is managed by the service, from the information processing apparatus, wherein the acceptance unit accepts selection of the group from among a plurality of groups corresponding to the information received by the receiving unit.

(Configuration 3)

The scan apparatus according to Configuration 2, wherein, in response to the transmission unit transmitting authentication information to the information processing apparatus, the information processing apparatus transmits the information about the group, and the receiving unit receives the information about the group.

(Configuration 4)

The scan apparatus according to Configuration 3, the acceptance unit further accepts the authentication information from the user.

(Configuration 5)

The scan apparatus according to Configuration 2, further includes a display unit configured to display a list of the plurality of groups corresponding to the information received by the receiving unit, wherein the acceptance unit accepts selection of the group from the list displayed by the display unit.

(Configuration 6)

The scan apparatus according to Configuration 1, further includes a position acceptance unit configured to accept, from the user, a position where the image of the image data is to be displayed, wherein the image data transmitted by the transmission unit is displayed at the position accepted by the position acceptance unit in the virtual space corresponding to the selected group.

(Configuration 7)

The scan apparatus according to Configuration 6, wherein the position that is accepted by the position acceptance unit is an object in the virtual space corresponding to the selected group.

(Configuration 8)

The scan apparatus according to Configuration 6, wherein the position that is accepted by the position acceptance unit is a position indicated by a three-dimensional (3D) coordinates in the virtual space corresponding to the selected group.

(Configuration 9)

The scan apparatus according to any one of Configurations 1 to 8, wherein the acceptance unit accepts an execution instruction from the user, and wherein, based on the execution instruction, the read unit generates the image data by reading the image of the document, and the transmission unit transmits the image data to the information processing apparatus.

(Configuration 10)

The scan apparatus according to Configuration 1, wherein the transmission unit transmits the image data and identification information on the selected group to the information processing apparatus.

(Configuration 11)

The scan apparatus according to any one of Configurations 1 to 8, wherein the service is an online meeting service, and a plurality of users of the group is able to share information by the service.

(Configuration 12)

The scan apparatus according to any one of Configurations 1 to 8, wherein the read unit includes a document tray and conveys a plurality of documents placed on the document tray, and wherein the read unit is configured to generate image data by reading images of the conveyed plurality of documents.

(Configuration 13)

An image processing method includes accepting, from a user, selection of a group that is managed by a service for information sharing in a virtual space, reading an image of a document to generate image data by scanning the image of the document, and transmitting the generated image data to an information processing apparatus that provides the service, wherein an image of the image data transmitted by the transmitting is displayed in a virtual space corresponding to the selected group.

(Configuration 14)

A program that causes a scan apparatus to perform accepting, from a user, selection of a group that is managed by a service for information sharing in a virtual space, reading an image of a document to generate image data by scanning the image of the document, and transmitting the generated image data to an information processing apparatus that provides the service, wherein an image of the image data transmitted by the transmitting is displayed in a virtual space corresponding to the selected group.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-105515, filed Jun. 30, 2022, which is hereby incorporated by reference herein in its entirety.

What is claimed is:

1. A scan apparatus that communicates with an external information processing apparatus that provides a service for infomraiton sharing in a virtual reality space displayable on a display of a head mounted display (HMD) device external from the scan apparatus, the scan apparatus comprising:
  a user interface that accepts, from a user,
    selection of a group from a set of groups displayed within the user interface, wherein the set of groups each represent a group in which the user participates and which are managed and received from the service based on user identification information provided to the service by the scan apparatus, the selected group representing a room in the virtual reality space displayable on the HMD device that includes other users participating in the selected group who are viewable, as avatars, within the room in the virtual reality space being displayed on the HMD device, and
    in response to the selection of the group, receiving selection, from within the user interface being displayed, of one or more object display positions each having respective image data position information representing one or more predefined locations within the room in the virtual reality space associated with the selected group, wherein the one or more predefined locations are viewable by the user and the other users of the selected group in the room in the virtual reality space, wherein the one or more object display positions are obtained by the scan apparatus from the service that manages the selected group;
  a scanner that generates image data by scanning an image of a document; and
  at least one memory storing instructions; and
  at least one processor that, upon execution of the stored instructions, is configured to operate as
    a communicator transmitting, over a network, to the service,
      the image data generated by the scanner with the image data position information corresponding to the selected one or more object display positions that are displayable on the HMD device, and
      responsive to receiving, from the service, an indication that the image data and the image data position information have been successfully received by the service, transmitting a post parameter with data that causes the service to use the image data position information to display, at the selected one or more object display positions, the generated image data to be viewable by the user and the other users of the selected group in the room in the virtual reality space such that the generated image data is rendered in the room in the virtual reality space viewable by the user and the other users of the selected group.

2. The scan apparatus according to claim 1, wherein the communicator receives information indicating a plurality of groups that are managed by the service, from the information processing apparatus, and wherein the user interface accepts, from the user, selection of the selected group from among the plurality of groups corresponding to the information received by the communicator.

3. The scan apparatus according to claim 2, wherein in response to the communicator transmitting authentication information to the information processing apparatus, information about the selected group is received from the information processing apparatus.

4. The scan apparatus according to claim 3, wherein the user interface further accepts, from the user, the authentication information that is transmitted to the information processing apparatus.

5. The scan apparatus according to claim 2,
wherein the user interface displays a list of the plurality of groups corresponding to the received information, and
wherein the user interface accepts selection of the selected group from the displayed list.

6. The scan apparatus according to claim 1, wherein the image data position information is a position indicated by three-dimensional (3D) coordinates in the virtual reality space being displayed on the display of the HMD device and which corresponds to the selected group.

7. The scan apparatus according to claim 1,
wherein the user interface accepts an execution instruction from the user, and
wherein, based on the execution instruction, the scanner generates the image data by scanning the image of the document, and the communicator transmits the image data to the information processing apparatus.

8. The scan apparatus according to claim 1, wherein the communicator transmits the image data and identification information on the selected group to the information processing apparatus.

9. The scan apparatus according to claim 1, wherein the service is an online meeting service, and a plurality of users of the selected group are able to share information by the service.

10. The scan apparatus according to claim 1,
wherein the scanner includes a document tray and conveys a plurality of documents placed on the document tray, and
wherein the scanner generates image data by scanning images of the conveyed plurality of documents.

11. An image processing method executed by a scan apparatus that communicates with an external information processing apparatus that provides a service for information sharing in a virtual reality space displayable on a display of a head mounted display (HMD) device external from the scan apparatus, the method comprising:
accepting, from a user, selection of a group from a set of groups displayed within a user interface, the set of groups each representing a group in which the user participates and which are managed and received from the service based on user identification information provided to the service by the scan apparatus, the selected group representing a room in the virtual reality space displayable on the HMD device that includes other users participating in the selected group who are viewable, as avatars, within the room in the virtual reality space being displayed on the HMD device;
accepting, in response to the selection of the group, a selection election, from within the user interface being displayed, of one or more object display positions each having respective image data position information representing one or more predefined locations within the rom room in the virtual reality space associated with the selected group, wherein the one or more predefined locations are viewable by the user and the other users of the selected group in the room in the virtual reality space, wherein the one or more object display positions are obtained by the scan apparatus from the service that manages the selected group;
scanning an image of a document to generate image data;
transmitting, over a network to the service,
the image data generated by the scanning with image data position information corresponding to the selected one or more object display positions that are displayable on the HMD device, and
responsive to receiving, from the service, an indication that the image data and the image data position information have been successfully received by the service, a post parameter with data that causes the service to use the image data position information to display, at the selected one or more object display positions, the generated image data to be viewable by the user and the other users of the selected group in the virtual reality space such that the generated image data is rendered in the room in the virtual reality space viewable by the user and the other users of the selected group.

12. A non-transitory computer-readable storage medium storing a program that causes a scan apparatus that communicates with an external information processing apparatus that provides a service for information sharing in a virtual reality space displayable on a display of a head mounted display (HMD) device external from the scan apparatus to perform operations including:
accepting, from a user, selection of a group from a set of groups displayed within a user interface, the set of groups each representing a group in which the user participates and which are managed and received from the service based on user identification information provided to the service by the scan apparatus, the selected group representing a room in the virtual reality space displayable on the HMD device that includes other users participating in the selected group who are viewable, as avatars, within the room in the virtual reality space being displayed on the HMD device;
accepting, in response to the selection of the group, a selection election, from within the user interface being displayed, of one or more object display positions each having respective image data position information representing one or more predefined locations within the room in the virtual reality space associated with the selected group, wherein the one or more predefined locations are viewable by the user and the other users of the selected group in the room in the virtual reality space, wherein the one or more object display positions are obtained by the scan apparatus from the service that manages the selected group;
scanning an image of a document to generate image data; and
transmitting, over a network to the service,
the image data generated by the scanning with image data position information corresponding to the selected one or more object display positions that are displayable on the HMD device, and
responsive to receiving, from the service, an indication that the image data and the image data position information have been successfully received by the service, a post parameter with data that causes the service to use the image data position information to display, at the selected one or more object display positions, the generated image data to be viewable by the user and the other users of the selected group in the virtual reality space such that the generated image data is rendered in the room in the virtual reality space viewable by the user and the other users of the selected group.

\* \* \* \* \*